Sept. 9, 1924.  
C. W. PLEUKHARP ET AL  
1,507,852  
GLASS FEEDER  
Filed March 9, 1922  
2 Sheets-Sheet 1

Inventors  
C. W. Pleukharp  
H. Raynes  
By Dewey, Strong,  
Townsend and Loftus.  
Attorneys

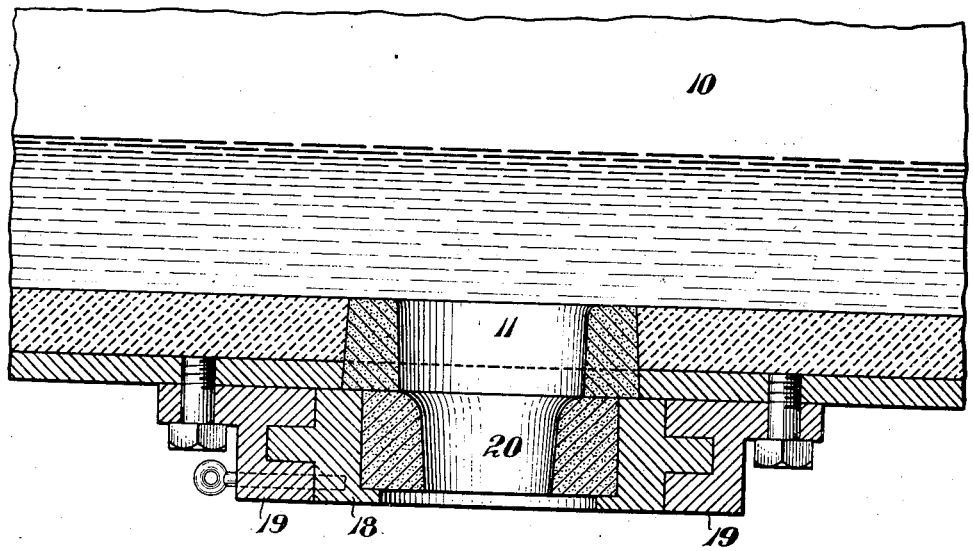
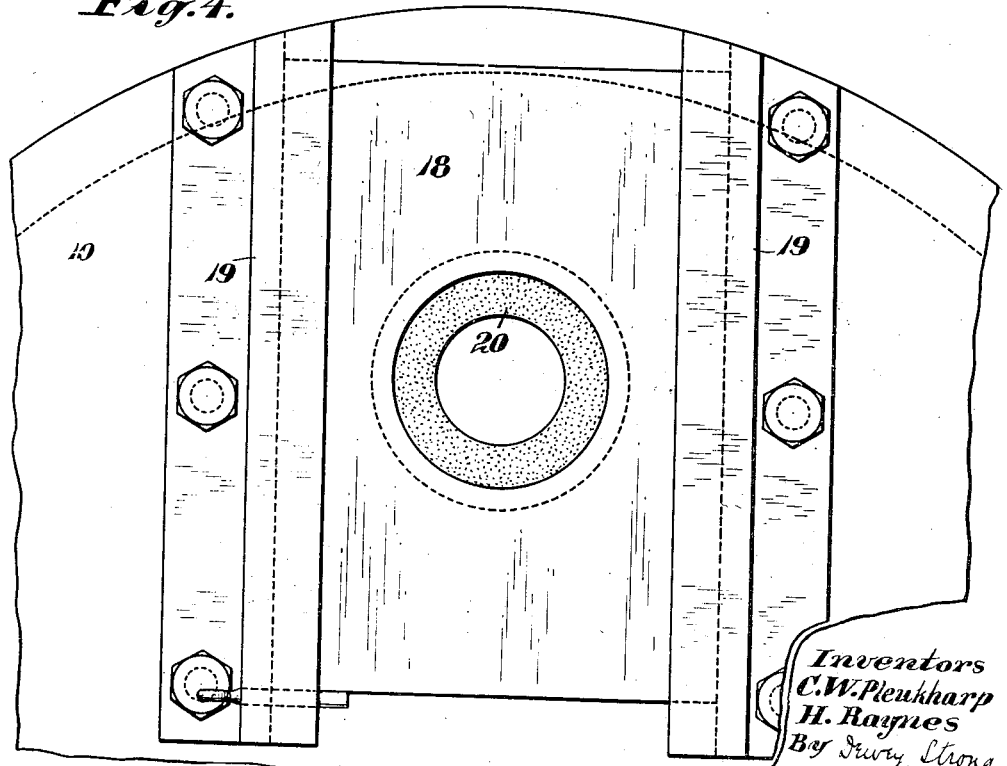

Patented Sept. 9, 1924.

1,507,852

UNITED STATES PATENT OFFICE.

CLAUDE W. PLEUKHARP AND HARRY RAYNES, OF SAN FRANCISCO, CALIFORNIA, ASSIGNORS TO ILLINOIS-PACIFIC GLASS CO., OF SAN FRANCISCO, CALIFORNIA, A CORPORATION OF CALIFORNIA.

GLASS FEEDER.

Application filed March 9, 1922. Serial No. 542,226.

*To all whom it may concern:*

Be it known that we, CLAUDE W. PLEUKHARP and HARRY RAYNES, citizens of the United States, residing at the city and county of San Francisco and State of California, have invented new and useful Improvements in Glass Feeders, of which the following is a specification.

This invention relates to glass feeders, and more particularly to a removable discharge spigot for the glass flowing vessel.

In glass feeders it is necessary to change the size of the discharge orifice at frequent intervals in order to vary the size of the charge. Heretofore the discharge orifice has been fitted with a stationary plug or spigot which is difficult to remove on account of the high temperatures surrounding the vessel. Ordinarily these spigots are chopped out or dislodged by a workman using a long rod. This operation takes considerable time, and, meantime, the glass continues to flow and great quantities are thereby wasted. The loss through wasted glass runs into large values over the period of the life of one of these machines.

The object of the present invention is to facilitate changing of these spigots or plugs and to eliminate waste in glass during the time of change. This we accomplish by using a movable plate fitting closely against the bottom of the tank or boot and having sliding contact therewith. This plate has one or more spigots to register with the discharge orifice in the boot. Where the plate carries one spigot the old plate can be thrust out and a new plate simultaneously inserted, and where the plate itself has a plurality of spigots it is only necessary to move the plate to bring a new spigot into place. During the movement of the plate it serves as a closure for the discharge orifice and thus loss of glass is prevented.

In the accompanying drawings, Fig. 1 shows a sectional view of a glass feeding boot equipped with one form of our invention.

Fig. 3 shows a sectional view of a modified form of the invention.

Fig. 4 shows an inverted plan view of the form of the device illustrated in Fig. 3.

Figure 1:
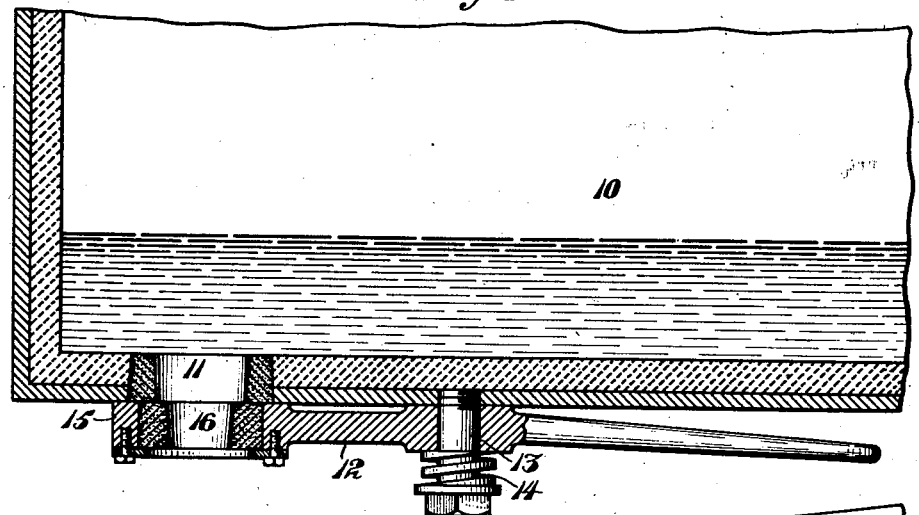
Figure 2:
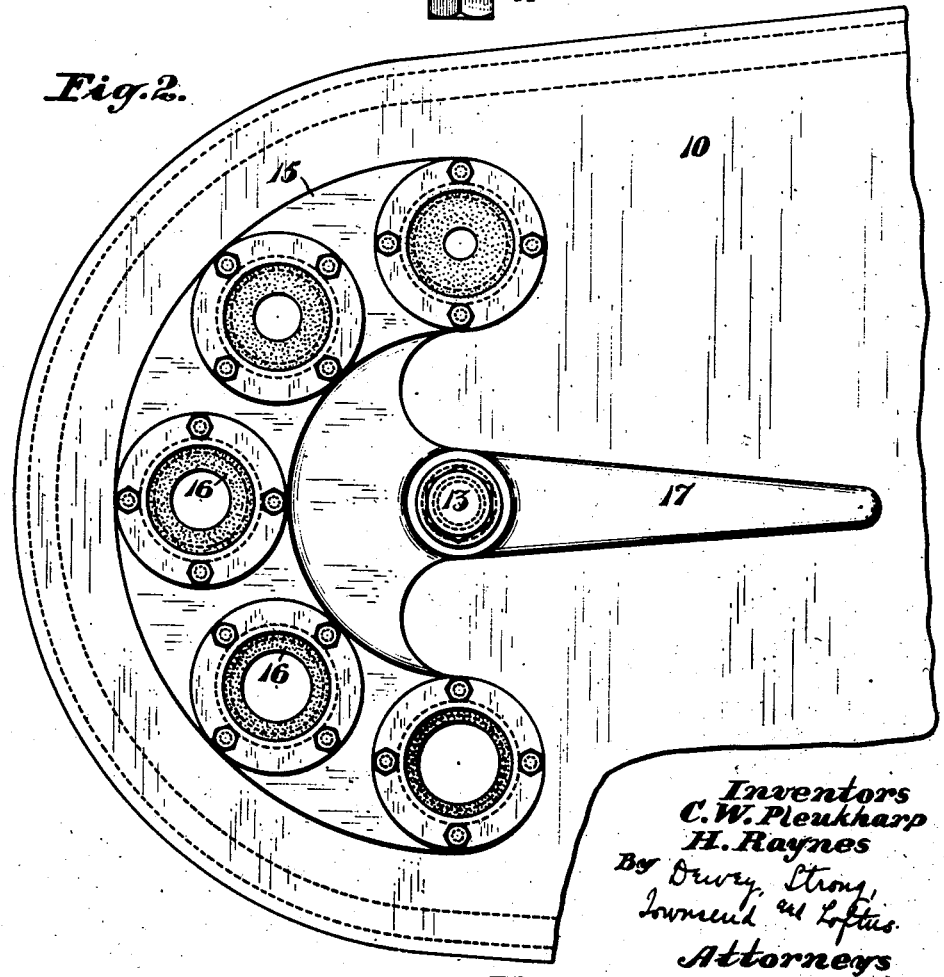
Fig. 2 shows an inverted plan view of the same.

A boot or glass feeding vessel is indicated at 10 and this is provided in its bottom with a discharge orifice 11. In the form of the device shown in Figs. 1 and 2 a plate 12 is pivotally mounted on a post 13 fixed to the bottom of the boot and pressed into place by means of a spring 14. The plate has an arcuate portion 15 which carries a series of spigots or plugs 16 arranged at spaced intervals to register with the discharge orifice 11. These spigots have apertures of varying size, and by means of a handle 17 the plate may be swung to bring any desired spigot into register with the discharge orifice.

In the form of the invention shown in Figs. 3 and 4 a plate 18 is slidably mounted in guides 19 fixed to the bottom of the boot. This plate 18 carries a single spigot 20 adapted to register with the discharge orifice. The guides are open at both ends so that a new plate can be moved into place, at the same time dislodging the old plate.

In both forms of the invention when a new or different sized spigot is to be put in place, the sliding plate serves to cut off the flow of glass. The work of changing spigots is thus made safe and comparatively easy and loss of glass through waste is overcome.

Various other changes in the form and construction of the device may be employed without departing from the spirit of our invention as disclosed.

Having thus described our invention, what we claim and desire to secure by Letters Patent is:—

1. The combination with a glass feeding vessel having a discharge orifice in its bottom of a movable plate having sliding contact with the bottom of the vessel, and a spigot consisting of a removable plug having an aperture and carried by said plate and adapted to be moved into register with the orifice when the plate is moved whereby one spigot may be substituted for another, the plate serving meantime to cut off the flow of glass.

2. The combination with a glass feeding vessel having a discharge orifice in its bottom of a movable plate having sliding contact with the bottom of the vessel, and a plurality of spigots of varying size carried upon the plate and adapted to be moved into successive register with the orifice when the plate is moved, whereby one spigot may be substituted for another, the plate meantime serving to cut off the flow of glass and being movable in either direction.

3. The combination with a glass feeding vessel having a discharge orifice in its bottom of a plate in contact with the bottom of the vessel, means for supporting the plate for sliding movement on the vessel, and a spigot carried by the plate and adapted to be moved into register with the orifice when the plate is moved whereby one spigot may be substituted for another, the plate meantime serving to cut off the flow of glass and being movable in either direction and the spigot being removable.

4. The combination with a glass feeding vessel having a discharge orifice in its bottom of a plate in contact with the bottom of the vessel, means supporting the plate for sliding movement on the vessel and a series of spigots arranged on the plate, each being of the same diameter and having an aperture of a different size and adapted to be moved into successive register with the orifice when the plate is moved whereby one spigot may be substituted for another, the plate meantime serving to cut off the flow of glass.

5. The combination with a glass feeding vessel having a discharge orifice in its bottom of an arcuate plate having a central handle member and pivotally mounted on the bottom of the vessel and having sliding contact therewith and a series of spigots, each of a different size carried by said plate and adapted to be moved into successive register with the discharge orifice whereby one spigot may be substituted for another, the plate meantime serving to cut off the flow of glass.

CLAUDE W. PLEUKHARP.
HARRY RAYNES.